US012213942B2

(12) United States Patent
Redkar et al.

(10) Patent No.: US 12,213,942 B2
(45) Date of Patent: Feb. 4, 2025

(54) SYSTEM FOR LONG TIME STORAGE OF PHARMACEUTICAL COMPOSITIONS AT LOW TEMPERATURES

(71) Applicants: SCHOTT Pharma AG & Co. KGaA, Mainz (DE); SCHOTT PHARMA SCHWEIZ AG, St. Gallen (CH); SCHOTT PHARMA USA, INC., Rye Brook, NY (US); SCHOTT PHARMA FRANCE SAS, Colombes (FR)

(72) Inventors: Rajendra Redkar, Clarks Summit, PA (US); Luce Sohier, Marly-le-Roi (FR); Alexander Humbertjean, Bad Krozingen (DE); Diana Löber, Bodenheim (DE); Alexander Traxl, Lustenau (AT)

(73) Assignees: SCHOTT Pharma AG & Co. KGaA, Mainz (DE); SCHOTT PHARMA SCHWEIZ AG, St. Gallen (DE); SCHOTT PHARMA USA, INC., Rye Brook, NY (US); SCHOTT PHARMA FRANCE SAS, Colombes (FR)

( * ) Notice: Subject to any disclaimer, the term of this patent is extended or adjusted under 35 U.S.C. 154(b) by 400 days.

(21) Appl. No.: 17/535,240

(22) Filed: Nov. 24, 2021

(65) Prior Publication Data

US 2022/0168185 A1 Jun. 2, 2022

Related U.S. Application Data

(60) Provisional application No. 63/118,768, filed on Nov. 27, 2020.

(51) Int. Cl.
*A61J 1/14* (2023.01)

(52) U.S. Cl.
CPC ........... *A61J 1/1412* (2013.01); *A61J 1/1468* (2015.05)

(58) Field of Classification Search
CPC ........... A61J 1/1412; A61J 1/1468; A61J 1/05
See application file for complete search history.

(56) References Cited

U.S. PATENT DOCUMENTS

| | | | | |
|---|---|---|---|---|
| 8,544,665 | B2 | 10/2013 | Bogle et al. | |
| 2003/0092607 | A1* | 5/2003 | Carpenter ............... | A61P 35/00 424/486 |

(Continued)

OTHER PUBLICATIONS

Extended European Search Report dated May 6, 2022 for European Patent Application No. 21209224.1 (8 pages).

(Continued)

*Primary Examiner* — Andrew J Mensh
*Assistant Examiner* — Nhu Q. Tran
(74) *Attorney, Agent, or Firm* — Taylor IP, P.C.

(57) ABSTRACT

At least one system for storage of pharmaceutical compositions includes: a container including a neck and a crown that includes an upper crown surface; a stopper including a flange and a plug, the flange including a lower flange surface and a flange height; and a holding element configured to exert a force on the crown and the flange to form a horizontal contact area between the upper crown surface and the lower flange surface. The horizontal contact area has a size of 30 $mm^2$ to 300 $mm^2$ and the flange height is compressed at least partially in the horizontal contact area by 10% to 40%.

19 Claims, 3 Drawing Sheets

(56) References Cited

U.S. PATENT DOCUMENTS

| | | | | |
|---|---|---|---|---|
| 2013/0312373 | A1* | 11/2013 | Bogle | B65B 7/28 53/485 |
| 2018/0015225 | A1* | 1/2018 | Vogt | A61P 21/00 |
| 2018/0036203 | A1* | 2/2018 | Zelinski | A61J 1/2096 |
| 2018/0147115 | A1 | 5/2018 | Nishioka et al. | |
| 2019/0177053 | A1* | 6/2019 | Duckworth | B65D 51/245 |
| 2020/0271541 | A1* | 8/2020 | Mathaes | G01M 3/229 |
| 2021/0017070 | A1* | 1/2021 | Suzuki | A61J 1/1468 |
| 2021/0212893 | A1* | 7/2021 | Christie | B65D 1/023 |
| 2021/0221550 | A1* | 7/2021 | Mangold | C03C 17/30 |

OTHER PUBLICATIONS

"Elastomeric parts for parenterals and for devices for pharmaceutical use—Part 5: Functional requirements and testing", EN ISO 8871-5:2016, Nov. 2016 (19 pages).

* cited by examiner

SYSTEM FOR LONG TIME STORAGE OF PHARMACEUTICAL COMPOSITIONS AT LOW TEMPERATURES

CROSS REFERENCE TO RELATED APPLICATIONS

This application claims priority to PCT Application No. PCT/US2020/063303 entitled "SYSTEM FOR LONG TIME STORAGE OF PHARMACEUTICAL COMPOSITIONS AT LOW TEMPERATURES," filed Dec. 4, 2020, which is incorporated in its entirety herein by reference. This application is a non-provisional application based upon U.S. provisional patent application Ser. No. 63/118,768 entitled "SYSTEM FOR LONG TIME STORAGE OF PHARMACEUTICAL COMPOSITIONS AT LOW TEMPERATURES," filed Nov. 27, 2020, which is incorporated in its entirety herein by reference.

BACKGROUND OF THE INVENTION

1. Field of the Invention

The present invention relates to storage systems, and, more particularly, to storage system for storing pharmaceutical compositions at low temperatures.

2. Description of the Related Art

Test Liquid pharmaceutical compositions for injecting humans or animals are commonly stored in systems comprising a container (e.g. a vial or cartridge), a stopper and a holding element (e.g. a crimp). Usually, the vial comprises a cylindrical body, a shoulder, a neck and a crown and the stopper comprises a plug and a flange. In a production line, the liquid pharmaceutical composition is filled into the vial under sterile conditions. For initially closing the system, the plug of the stopper is inserted in the neck of the vial and held in position by radial forces between the plug and the neck. For permanently closing the system, the stopper is fixed by a crimp or a press-fit cap on the vial. The closed system can accommodate the liquid pharmaceutical composition for several days or even up to several years until the composition is injected into a human or animal. For an easy application, it is advantageous that the stopper can be penetrated by a needle, e.g. a needle of a syringe or a vial adapter, so that the system does not have to be reopened. While the requirements for these systems under ambient conditions, e.g. normal pressure and room temperature, are relatively low, it has been found that under severe conditions, like very low temperatures or high temperatures and large pressure differences between inside and outside the system, the sterility of the interior of the system and of the liquid pharmaceutical composition cannot be guaranteed, especially on large time scales. If the system is closed under ambient conditions (i.e. 1.0 bar and 20° C.) and then cooled down to −80° C. or even −190° C., the pressure inside the system may decrease to about 0.6 bar or 0.3 bar respectively. Reversely, if the system is filled and stored at low temperatures, e.g. at 0° C., and administered at ambient conditions, the pressure inside the system is higher than outside the system.

Thereby especially the following problems have been recognized:

i) leakage between the stopper and the container;

ii) brittleness of the stopper in cooled state;

iii) oblique position of the stopper on the container; and iv) slipping out of place of the stopper during cooling.

What is needed in the art is a way to address at least some of the issues with known storage systems.

SUMMARY OF THE INVENTION

In some exemplary embodiments provided according to the invention, at least one system for storage of pharmaceutical compositions includes: a container including a neck and a crown, the crown including an upper crown surface; a stopper including a flange and a plug, the flange including a lower flange surface and a flange height; and a holding element configured to exert a force on the crown and the flange to form a horizontal contact area between the upper crown surface and the lower flange surface, the horizontal contact area having a size of 30 $mm^2$ to 300 $mm^2$ and the flange height being compressed at least partially in the horizontal contact area by 10% to 40%.

In some exemplary embodiments provided according to the invention, at least one system for storage of pharmaceutical compositions includes: a container including a neck and a crown, the crown including an upper crown surface; a stopper including a flange and a plug, the flange including a lower flange surface and a flange height; and a holding element configured to exert a force on the crown and the flange to form a horizontal contact area between the upper crown surface and the lower flange surface, the flange height being compressed at least partially in the horizontal contact area by 10% to 40%. The at least one system passes a modified container closure integrity test, which is a test according to DIN EN ISO 8871-5:2016; chapter 4.4 in combination with Annex D, where a pressure in part D.4.2 in Annex D is increased to 2 bar instead of decreased to 27 kPa.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
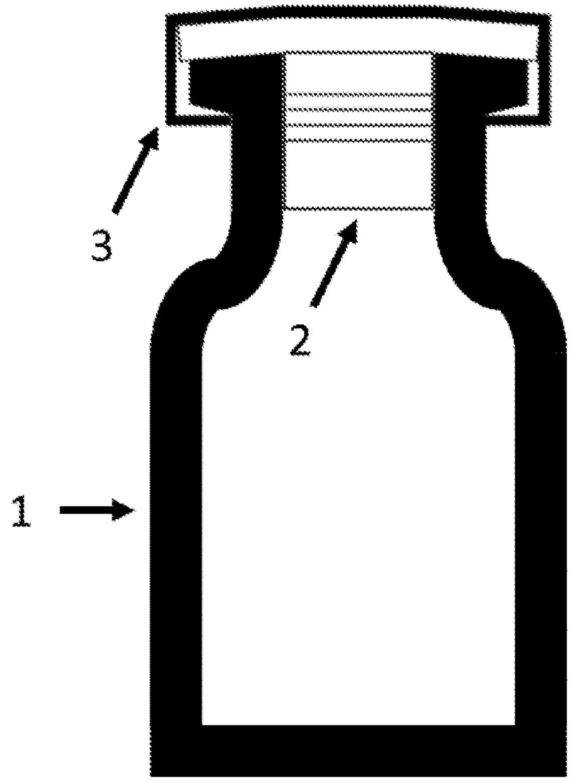
FIG. 1 illustrates a cross-section of an exemplary embodiment of a system provided according to the invention.

The previously described problems may be solved by a use of a system for long time storage of pharmaceutical compositions at low temperature, the system comprising: a container 1 comprising a neck 11 and a crown 13, the crown 13 comprising an upper crown surface 131; a stopper 2 comprising a flange 21 and a plug 22, the flange 21 comprising a lower flange surface 211 and a flange height 212; and a holding element 3 configured to exert a force on the crown 13 and the flange 21 to form a horizontal contact area 19 between the upper crown surface 131 and the lower flange surface 211. The horizontal contact area 19 has a size of 30 $mm^2$ to 300 $mm^2$ and the flange height 212 is compressed at least partially in the horizontal contact area 19 by 10% to 40%.

The previously described problems may also be solved by a system for long time storage of pharmaceutical compositions at low temperature, the system comprising: a container 1 comprising a neck 11 and a crown 13, the crown 13 comprising an upper crown surface 131; a stopper 2 comprising a flange 21 and a plug 22, the flange 21 comprising a lower flange surface 211 and a flange height 212; and a holding element 3 configured to exert a force on the crown 13 and the flange 21 to form a horizontal contact area 19 between the upper crown surface 131 and the lower flange surface 211. The horizontal contact area 19 has a size of 30 $mm^2$ to 300 $mm^2$ and the flange height 212 is compressed at least partially in the horizontal contact area 19 by 10% to 40%.

In addition, the previously described problems may be solved by a method for closing a container 1 for long time storage of pharmaceutical compositions at low temperature, which may be a previously described container, comprising the following steps: providing a container 1 comprising a neck 11 and a crown 13, the crown 13 comprising an upper crown surface 131; positioning a stopper 2 comprising a flange 21 and a plug 22, the flange 21 comprising a lower flange surface 211 and a flange height 212 such that the plug 22 is positioned in the neck 11 and the upper crown surface 131 is in contact with the lower flange surface 211; exerting a force on the crown 13 and the flange 21 to form a horizontal contact area 19 between the upper crown surface 131 and the lower flange surface 211 by a holding element 3 such that the following conditions are fulfilled:

i) the horizontal contact area 19 has a size of 30 $mm^2$ to 300 $mm^2$; and
ii) the flange height 212 is compressed at least partially in the horizontal contact area 19 by 10% to 40%.

Furthermore, the problem may be solved by a bundle comprising 5 or more, for example 5 to 10000, 15 to 5000, 20 to 500, or 50 to 200, systems provided according to any embodiment described herein. In some embodiments, the bundle comprises at least 1000 systems provided according to any embodiment described herein.

In addition, the problem may be solved by a kit for long time storage of pharmaceutical compositions at low temperature, the kit comprising: a container 1 comprising a neck 11 and a crown 13, the crown 13 comprising an upper crown surface 131; a stopper 2 comprising a flange 21 and a plug 22, the flange 21 comprising a lower flange surface 211 and a flange height 212. When the stopper is inserted in the container, a horizontal contact area 19 is formed and a force is exerted on the crown 13 and the flange 21 so that the flange height 212 is compressed at least partially in the horizontal contact area 19 by 10% to 40%, the horizontal contact area 19 has a size of 30 $mm^2$ to 300 $mm^2$.

According to the invention, the container comprises a neck and a crown, the crown comprising an upper crown surface.

In some embodiments, the container comprises, for example in a direction from the top to the bottom, one or more of the parts:

a crown located at the top;
a neck that may follow the crown;
a shoulder that may follow the neck;
a cylindrical portion that may follow the shoulder; and/or
a bottom (i.e. a vial) or an open end at the bottom, which may be closed by a further plunger (i.e. a cartridge).

In some embodiments, the upper crown surface, for example the container, exhibits a coaxial shape. Thus, a homogenous compression can be ensured.

In some embodiments, the container is a vial and/or a cartridge. Thus, a secure storage of the pharmaceutical composition is ensured.

In some embodiments, the container comprises, for example is made of, glass, such as borosilicate glass or alumosilicate glass; or polymer, such as cyclic olefin polymer (COP) or cyclic olefin copolymer (COC). Glass exhibits enhanced barrier properties, e.g. with regard to oxygen. The inner and/or outer surface of the container may be coated.

In general, the dimensions and angles of the crown are not particularly limited. However, it has been surprisingly found that specific dimensions and angles of the crown of the container influence the properties of the system.

In some embodiments, the inner crown diameter is 3 mm to 25 mm, for example 4 mm to 20 mm, 5 mm to 15 mm, 6.5 mm to 10 mm, 6.9 mm to 7.1 mm, or 6.95 mm to 7.05 mm; and/or the outer crown diameter 142 is 4 mm to 33 mm, for example 5 mm to 30 mm, 8 mm to 20 mm, 12.8 mm to 13.1 mm, or 12.95 mm to 13.05 mm; and/or the crown height is 2 mm to 5 mm, for example 3 mm to 4 mm, 3.4 mm to 3.8 mm, 3.5 mm to 3.7 mm, or 3.55 mm to 3.65 mm. If the inner crown diameter, the outer crown diameter and the height of the crown are in the exemplary ranges, the leakage between the stopper and the container can be reduced.

Furthermore, it has been recognized that it may be advantageous if the distance between the upper inner crown edge and the lower inner crown edge is 3 mm to 5 mm, for example 3.8 mm to 4.6 mm, 3.9 mm to 4.2 mm, or 4.0 mm to 4.1 mm. This distance is important since it influences the compression force of the holding element.

In addition, it has been recognized that it may be advantageous if the angle between a line, defined by the upper crown surface, and a line, defined by the center axis of the container, is 75° to 89.99°, for example 80° to 89.5°, 85° to 89°, 85.5° to 88.5°, or 86.5° to 87.5°. If the angle between a line defined by the upper crown surface and a line, defined by the center axis of the neck, is less than 90°, e.g. 89.5° or less, for example 89° or less, an edge is formed at which the stopper is compressed most, forming a very tight annular area between the stopper and the container. However, if the angle is too small, e.g. smaller than 75°, for example 85°, the corner is too sharp, and under very harsh conditions, this might lead to damage or even breakage of the stopper during the closing process.

Furthermore, in some embodiments the angle between a line, defined by the lower crown surface, and a line, defined by the center axis of the container, is 65° to 87°, for example 70° to 86° or 75° to 85°. The angle influences the lever of the holding element. If the angle is in the exemplary range, the stability of the system is enhanced and a long time storage can be ensured.

In some embodiments, the ratio [$^{501}$ /$^{501}$ ] of the minimal value of the angle between a line, defined by the upper crown surface, and a line, defined by the center axis of the container, and the maximal value of the angle between a line, defined by the upper crown surface, and a line, defined by the center axis of the neck, is 0.8 or more, for example 0.9 or more, 0.95 or more, 0.97 or more; and/or and, 0.99 or less. Thus, a correct positioning of the stopper can be ensured leading to an improved tightness under harsh conditions.

Furthermore, it has been surprisingly found that the angle between a line, defined by the upper inner crown edge and the lower inner crown edge, and a line, defined by the center axis of the neck influences the properties of the system. In some embodiments, the angle between a line, defined by the upper inner crown edge and the lower inner crown edge, and a line, defined by the center axis of the neck, is 10° to 50°, for example 12° to 42°, 15° to 37°, or 20° to 33°. The angle influences the longtime stability of the holding element, since this angle influences the leverage force of the holding element. The smaller the angle, the better the leverage effect. However, if the angle is too small the crown and the neck of the container might become fragile and it might occur that the container breaks during the closing process. For these reasons, an angle between 15° to 37°, for example 20° to 33° enhances the stability of the system, especially if the pressure inside the system differs significantly from the pressure outside the container.

In addition, it has been recognized that the ovality of the container influences the correct positioning of the stopper during the closing process and thus influences the position of the stopper on the container. Therefore, in some embodiments the ratio [mm/mm] of the values of the minimal and maximal inner crown diameter is 0.95 to 1.00, for example 0.96 to 0.99 or 0.97 to 0.98. Thus, a correct positioning of the stopper can be ensured leading to an improved tightness under harsh conditions.

Furthermore, it has been recognized that the roughness of the upper crown surface may influence the tightness of the system. For these reasons, in some embodiments the upper crown surface has an average surface roughness Ra of 2 nm to 200 nm, for example 5 nm to 100 nm, 10 nm to 75 nm, or 25 nm to 50 nm. The average surface roughness of the upper crown surface in the exemplary ranges contributes to the contact surface between the upper crown surface and the lower flange surface. Larger values of the average surface roughness of the upper crown surface might lead to gaps between the upper crown surface and the lower flange surface affecting the container closure integrity. Smaller values of the average surface roughness of the upper crown surface might lead to sliding of the lower flange surface of the plunger on the upper crown surface affecting the container closure integrity.

In some embodiments, the inner and/or outer surface of the container is coated, for example coated by a coating comprising silicone or a coating obtained by chemical vapor deposition (CVD) method, such as PICVD or PECVD method. The coating may be a hydrophilic or hydrophobic coating. For example, if the coating is a hydrophobic coating, contamination of the neck and the upper crown surface by a pharmaceutical composition, for example a pharmaceutical composition comprising water, during the filling process can be prevented. However, it has been recognized that, if the upper crown surface is coated as well, this can adversely affect the tightness of the system. Thus, in some embodiments the upper crown surface is uncoated. To obtain a coated container, wherein the upper crown surface is not coated, it is either possible to cover the upper crown surface during the coating process or to clean or polish the upper crown surface after the coating process.

According to the invention, the stopper comprises a flange and a plug, the flange comprising a lower flange surface and a flange height.

The plug and/or the lower flange surface may comprise grooves. The inside of the plug may be filled or hollow. The height of the flange is not particularly limited. In some embodiments, the flange height is 0.1 mm to 6 mm, for example 1 to 5 mm, 2 mm to 4 mm, or 2.5 mm to 3.9 mm. In some embodiments, the stopper exhibits a coaxial shape. Thus, a homogenous compression can be ensured.

The material of the stopper is not particularly limited. In some embodiments, the stopper comprises, for example is made of, a thermoplastic elastomer, for example a thermoplastic elastomer comprising butyl groups and halogen, such as F, Cl and/or Br. If this material is used, the brittleness under severe conditions is reduced.

The mechanical properties of the stopper are not particularly limited. In some embodiments, the E Module of the stopper is 1 $N/mm^2$ to 10 $N/mm^2$, for example 2 $N/mm^2$ to 8 $N/mm^2$, 2.4 $N/mm^2$ to 7.3 $N/mm^2$, or 4.4 $N/mm^2$ to 6.6 $N/mm^2$. Additionally or alternatively, the shore hardness A of the stopper may be 40 to 80, for example 42 to 60, 45 to 55, or 47 to 52. If the E Module and the shore hardness A are in the exemplary regions, a sufficient compression of the stopper can be further ensured and a slipping or moving out of place of the stopper during the cooling process can be further suppressed.

The roughness of the lower flange surface of the stopper is not particularly limited, In some embodiments, the lower flange surface has an average surface roughness Ra of 1 nm to 1000 nm, for example 3 nm to 200 nm, 5 nm to 100 nm, 10 nm to 75 nm, or 25 nm to 50 nm. The roughness of the lower flange surface of the stopper and the upper crown surface of the container may influence each other. If both values are in the exemplary ranges the tightness of the system can be further improved and slipping or moving out of place of the stopper during the cooling process can be further depressed.

According to the invention, the system comprises a holding element. In some embodiments, the holding element is a crimp or a cap, for example a press fit cap, an aluminum hole cap, a pull off cap, a finger design cap, a scoreline design cap, a bridge design cap, a scoreline tear off cap, a center tear off cap, a double tear off cap, an universal tear off cap and/or an flip tear off cap. A press fit cap may have the advantage that a homogeneous compression can be ensured. A (aluminum) crimp cap may have the advantage that it is very robust and has greater compatibility with further components like, e.g., vial adapters.

The holding element may be at least in direct contact with the lower crown surface of the container and the upper flange surface of the stopper. Thus, a secure compression of the flange can be achieved for a long storage time.

The holding element may comprise, for example is made of, a plastic, a polymer and/or metal, such as aluminum. Aluminum may have the advantage that it less vulnerable to low temperatures.

Herein low temperature may be a temperature of −220° C. or more and less than 0° C. The temperature influences significantly the performance of the system. It has been surprisingly found that the system described herein exhibits outstanding performance even in temperatures regions of −200° C. or more and less than 0° C., for example −196° C. or more and −10° C. or less, −100° C. or more and −15° C. or less, or −90° C. or more and −50° C. or less. Ambient temperature or room temperature herein is 20° C.

The pressure inside the system is not particularly limited. However, it has been surprisingly found that the system described herein exhibits outstanding performance even if the pressure inside the container is less than ambient pressure, for example 0.1 to 0.9 bar, 0.2 to 0.8 bar, or 0.3 bar to 0.7 bar. Ambient pressure herein is 1.0 bar.

The storage time is not particularly limited. In some embodiments, long time storage is 1 day or more and 5 years or less, for example 7 days or more and 4 years or less, 1 month or more and 3 years or less, or 6 months or more and 18 months or less. Long time storage herein in general means 1 day or more. In some embodiments, the storage time is the time of storage at low temperature. Furthermore, the pharmaceutical composition can be stored, for example additional, before and/or subsequent to storage at low temperature, for several days, e.g. up to 10 days, for example up to 2 days or up to 1 day at ambient conditions or in a common household refrigerator, i.e. at 0° C. to 15° C.

The pharmaceutical composition herein is not particularly limited. The pharmaceutical composition can be solid, e.g. a powder, a cake, or a liquid at room temperature. In some embodiments, the pharmaceutical composition is a liquid. Usually the pharmaceutical composition comprises a medically active substance and a carrier or solvent. A further exemplary pharmaceutical composition is a parenterialium, i.e. a composition which is intended to be administered via the parenteral route, which may be any route which is not enteral. Parenteral administration can be performed by injection, e.g. using a needle (usually a hypodermic needle) and a syringe. In some embodiments, the system, for example the container, comprises a pharmaceutical composition comprising water, for example 10 wt-% to 100 wt-% water or 50 wt-% to 99 wt-%. It has been surprisingly found that the system described herein exhibits outstanding performance under severe conditions and even if the pharmaceutical composition comprises water and is a frozen liquid. It has been recognized that if the composition comprises water, water vapor is generated during the filling process and if the system is cooled to low temperatures this water condenses or resublimes and may further reduce the pressure in the closed system.

In some embodiments, the system, for example the container, comprises a pharmaceutical composition comprising RNA, such as mRNA, vectors and/or cells. It has been recognized that the system described herein shows improved performance for these applications.

It has been surprisingly found that especially the interactions between the container and the stopper play an important role to overcome the previously described problems. While there are several systems known and available to store pharmaceutical compositions at ambient conditions, it has been recognized that for the storage of pharmaceutical compositions under severe conditions, e.g. low temperature and/or low pressure, the stopper and the container must be matched or adapted in order to act together, for example in a synergistic fashion. In addition, even for compatible stoppers and containers the specific compression properties of the stopper in interaction with the container play an important role.

It has been surprisingly found that to secure the tightness of the system it is necessary that the horizontal contact area has a size of 30 $mm^2$ to 300 $mm^2$ and that the flange height is compressed in the horizontal contact area by 10% to 40%.

In some embodiments, the horizontal contact area has a size of 50 $mm^2$ to 250 $mm^2$, for example 80 $mm^2$ to 220 $mm^2$, 100 $mm^2$ to 180 $mm^2$, or 120 $mm^2$ to 150 $mm^2$. In general, a larger horizontal contact area corresponds to a higher tightness due to the increased sealing surface. However, the force, which can be applied by the holding element, is limited. Thus, if the horizontal contact area is too large, the force, which is applied by the holding element is not sufficient and under severe conditions, e.g. low temperature and/or large pressure differences between inside and outside the container, leakage can occur.

Similarly, the width of the horizontal contact area plays an important role. Thus, in some embodiments the horizontal contact area has a width of 0.1 mm to 5 mm, for example 0.2 mm to 4 mm, 0.3 mm to 3 mm, or 0.4 mm to 2.5 mm. In general, a wider horizontal contact area corresponds to a higher tightness due to the increased sealing surface. However, the force which can be applied by the holding element, is limited. Thus, if the horizontal contact area is too wide, the force, which is applied by the holding element is not sufficient and under severe conditions, e.g. lower temperature and/or large pressure differences between inside and outside the container, leakage can occur.

In some embodiments, the flange height is compressed by 15 to 30%, for example 20 to 25%. If the compression increases, the tightness can be improved. However, if the compression is too large, it might happen that either the container, especially the crown, breaks or the stopper gets damaged. Therefore, a best result may be obtained, if the horizontal contact area, the compression of the flange height and the angle between a line defined by the upper crown surface and a line, defined by the center axis of the neck, are within the ranges described herein, since these parameters act strongly together.

According to the invention, the flange height is compressed at least partially in the horizontal contact area by 10% to 40%. In some embodiments, the horizontal contact area comprises the upper inner crown edge and the flange height is compressed at the upper inner crown edge by 10% to 40%, for example 20 to 35% or 25 to 30%. It has been surprisingly recognized that the compression at the upper inner crown edge has a significant influence on the tightness of the system, especially under severe conditions. If the compression is too low, it might happen that fluid can pass from the inside to the outside or vice versa. If the compression is too high, it might happen that the stopper gets damaged leading to leakage, especially when the container is cooled to temperatures of −196° C. to −20° C. and then heated to room temperature again. The system shows extraordinary performance if the compression, especially at the upper inner crown edge, is in the above-described region and the stopper exhibits an E Module of 1 $N/mm^2$ to 10 $N/mm^2$, for example 2 $N/mm^2$ to 8 $N/mm^2$, 2.4 $N/mm^2$ to 7.3 $N/mm^2$, or 4.4 $N/mm^2$ to 6.6 N/mm. The tightness can be further improved if the shore hardness A of the stopper is 40 to 80, for example 42 to 60, 45 to 55, or 47 to 52.

In some embodiments, the flange height is compressed in the entire horizontal contact area, by 10% to 40%, for example 20 to 35% or 25 to 30%. Thus, a homogenous surface can be ensured and the stopper is further prevented from getting damaged, especially when the system is cooled to low temperature.

To improve the tightness and prevent the stopper from slipping or moving out of place, in some embodiments the ratio [nm/nm] of the average surface roughness Ra of the upper crown surface to the average surface roughness Ra of the lower flange surface is 1 or less, for example 0.8 or less, 0.5 or less, 0.1 or less, 0.01 or less, or $1*10^{-3}$ or less.

In some embodiments, the system, for example all systems in the bundle, pass(es) the container closure integrity test according to DIN EN ISO 8871-5:2016; chapter 4.4 in combination with Annex D. Thus, it is ensured that the system/the bundle exhibits an outstanding performance. In addition, the safety of the system is ensured and it especially suitable for human use.

In some embodiments, the system, for example all systems in the bundle, pass(es) a modified container closure integrity test, wherein the modified container closure integrity test is a test according to DIN EN ISO 8871-5:2016; chapter 4.4 in combination with Annex D, wherein the pressure in part D.4.2 in Annex D is increased to 2 bar instead of decreased to 27 kPa. If the system(s) pass(es) this modified test, it is especially suitable for low temperature applications.

In some embodiments, the system exhibits a low temperature. In some embodiments, the pressure inside the system is 1.0 bar measured at 20° C.

In some embodiments, the method further comprises the step: cooling the system to a low temperature. Thus, the superior low temperature application of the system is guaranteed and the pharmaceutical composition can be stored for a long time.

In some embodiments, the method comprises the steps, which may be in this order:

- providing a container comprising a neck and a crown, the crown comprising an upper crown surface;
- filling the container with a pharmaceutical composition;
- positioning a stopper comprising a flange and a plug, the flange comprising a lower flange surface and a flange height such that the plug is positioned in the neck and the upper crown surface is in contact with the lower flange surface;
- exerting a force on the crown and the flange to form a horizontal contact area between the upper crown surface and the lower flange surface by a holding element such that the following conditions are fulfilled:
  - i) the horizontal contact area has a size of 30 $mm^2$ to 300 $mm^2$; and
  - ii) the flange height is compressed at least partially in the horizontal contact area by 10% to 40%;
- cooling the system to a low temperature;
- storing the system for 1 day to 1000 days, for example 7 day to 350 days or 30 days to 150 days at the low temperature;
- heating the system, for example to room temperature; and
- discharging at least a part of the pharmaceutical composition out of the system within 1 month, for example 1 wee or 1 day. Thus, secure administration of the pharmaceutical composition can be guaranteed.

To further ensure that all systems in the bundle exhibit the advantageous properties, in some embodiments all relevant values of each container in the bundle must be measured. Since the stopper is elastic, the values of the stopper can slightly vary as long as the compression is within the region described herein when the system is assembled.

In some embodiments, the kit further comprises a holding elemen configured to exert the force on the crown and the flange.

Definitions and Methods

Angles, distances and points, etc. mentioned herein always refer to the cross-section comprising the center axis of the neck through the system, i.e. container, stopper and/or holding element, if not stated otherwise. In addition, if not stated otherwise it refers to all angles, distances and points of the container. For example if the inner crown diameter is restricted to 3 mm to 25 mm, all diameters which can be measured in cross section must be within this range. In contrast thereto, the minimal inner crown diameter is the shortest inner crown diameter obtained from all inner crown diameters. A person skilled in the art knows how to determine these areas, distances and angles. Either a caliper, transmitted light microscope techniques, NMR techniques, e.g. MRI techniques or X-ray techniques, e.g. CT techniques, can be used to determine the values and angles. The areas, distances and angles may be obtained by a CT measurement.

Herein the center axis of the neck (and container) is defined by the neck, for example by the neck and the cylindrical portion of the container. The center axis of the stopper is defined by the plug.

The upper inner crown edge is the inner edge formed by the upper crown surface and the neck. In some embodiments, the upper inner crown edge is the highest point of the container, when the container stands on an even ground (see 151 in FIG. 3).

Figure 3:
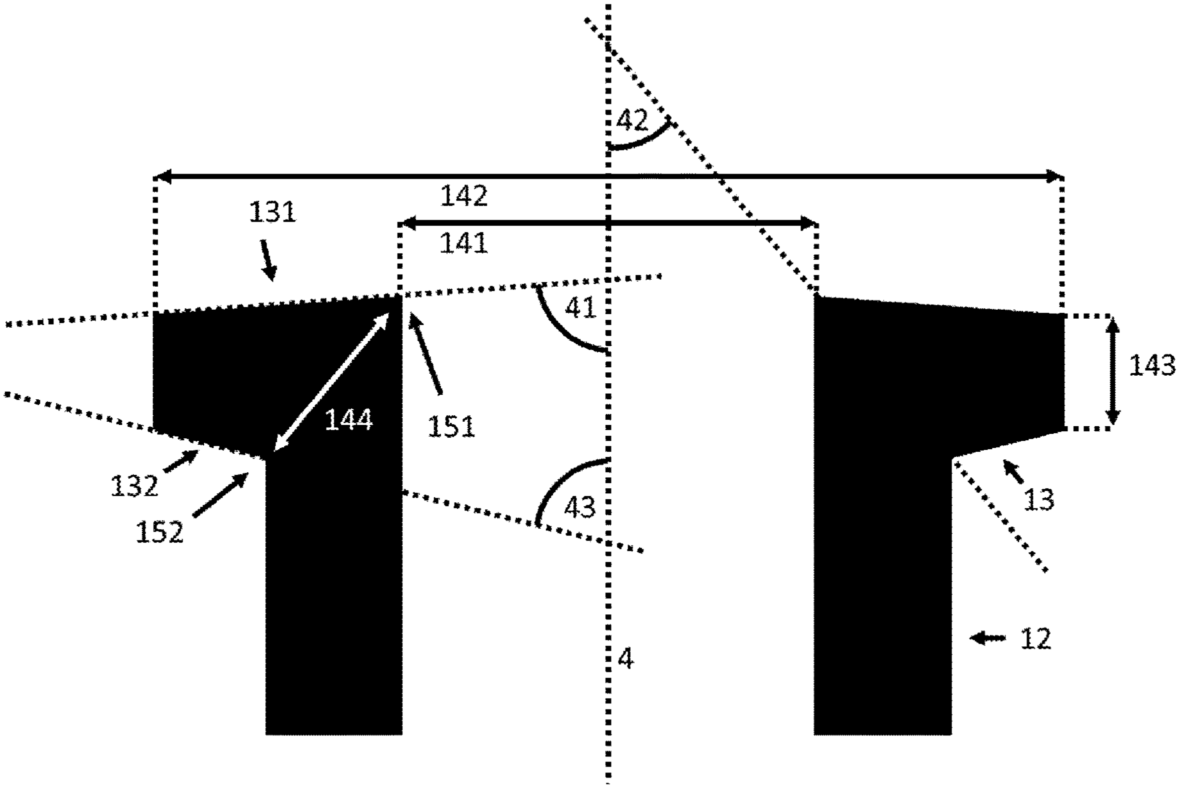
FIG. 3 illustrates a cross-section of an exemplary embodiment of an upper part of a container provided according to the invention.

The lower inner crown edge is the edge formed at the transition of the crown to neck at the outer surface of the container (see 152 in FIG. 3). In some embodiments, it is the highest point of the cylindrical portion of the neck.

The outer crown diameter is the distance measured from largest radial extend of the crown to the opposite largest radial extend of the crown through the center axis of the neck (see 142 in FIG. 3).

The inner crown diameter is the distance measured from smallest radial extend of the crown to the opposite smallest radial extend of the crown through the center axis of the neck (see 141 in FIG. 3). In some embodiments, the inner crown diameter is the inner diameter of the neck.

The horizontal contact surface is the contact area of the upper crown surface and the lower flange surface, for example at an angle of 80° to 90° with regard to the center axis of the neck. In some embodiments, the horizontal contact surface exhibits right circular conical frustum shape.

Figure 4:
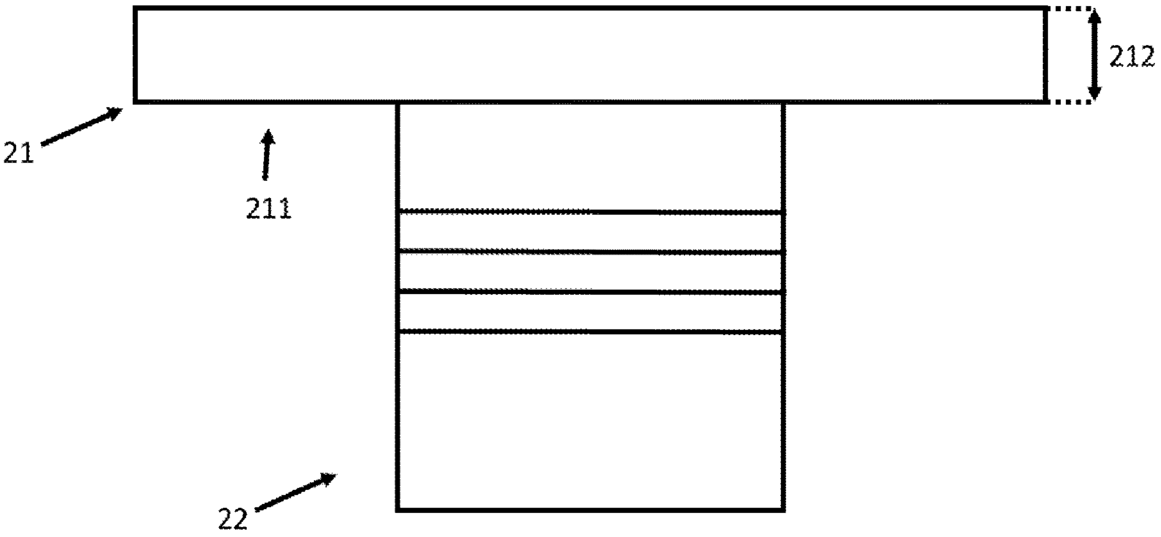
FIG. 4: illustrates a cross-section of an exemplary embodiment of a stopper provided according to the invention.

The flange height herein is the height of the flange when the stopper is not compressed (see 212 in FIG. 4). The compression herein refers to the compression of the flange height [mm/mm] in a direction parallel to the center axis of the neck.

The upper crown surface is the crown surface facing upwards when the container stands on an even ground (see 131 in FIG. 3), for example at an angle of 80° to 90° with regard to the center axis of the neck.

The lower crown surface is the crown surface facing downwards when the container stands on an even ground (see 132 in FIG. 3), for example at an angle of 60° to 90° with regard to the center axis of the neck.

The lower flange surface is the flange surface facing downwards when the stopper stands on the plug on an even ground (see 211 in FIG. 4), for example at an angle of 60° to 90° with regard to the center axis of the plug.

The shore hardness A can be determined according to DIN ISO 7619-1:2012-02.

Herein, a bundle is a trading, loading or packaging unit for distribution of systems described herein. For example, products usually, but not necessarily, of the same kind are combined as bundles when ordered together in retail or bundled in logistics. According to the invention, the systems can be separated by a spacer, for example a plastic and/or paper sheet, so that they are not in contact with each other during transport. Usually, but not necessarily, the bundle is at least partly covered by a plastic foil. In some embodiments, one bundle contains 5 or more, for example 5 to 10000, 15 to 5000, 20 to 500, or 50 to 200, systems according to any embodiment described herein. Due to economic reasons, in some embodiments the bundle contains 20 to 1000, for example 40 to 600, 50 to 300, or 75 to 250 systems according to any embodiment described herein and wherein the systems are, in some embodiments, not in direct contact to each other. In some embodiments, several, e.g. 2 to 1000 bundles, for example 20 to 200 bundles are stacked on a pallet. Thus, according to one aspect of the invention, a pallet comprises 2 to 1000 bundles, for example 20 to 200 bundles.

The average surface roughness (Ra) can be obtained by a measure of the texture of a surface. It is quantified by the vertical deviations of a real surface from its ideal form. Commonly amplitude parameters characterize the surface based on the vertical deviations of the roughness profile from the mean line. Ra is the arithmetic mean of the absolute values of these vertical deviations. Evaluating the average surface roughness of a certain surface area might be accomplished by the evaluation of a topographic profile of the respective substrate.

For example, an optical 3D-profiler might be used, which allows due to its features to map structures on the surface. This means the profiler can have a lateral resolution of up to 0.5 μm, whereby the depth resolution (for example along the z axis) might be much less than 10 nm. Hence, field of views which are appropriate for the sizes of the structures are possible.

For example, the following profiler might be employed:

Manufacturer: ZYGO

Device type: "nexview"

Optical zoom: 0.5× (0.75× and 1.0×)

Objective lenses: 5.5×, 10×, 20×, and 50× Mirau

Camera: 1024×1024 $px^2$

The application which might be used for evaluation is based on the standard application of the "Mx" software of this type of device.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. Exemplary embodiments described for the use also apply for the system, the method, the kit and/or the bundle and vice versa, if not stated otherwise.

Referring now to the drawings, FIG. 1 shows a cross section of an exemplary embodiment of a system provided according to the invention. The system comprises a container 1, i.e. a vial, a stopper 2 and a holding element 3, i.e. a crimp. The stopper 2 is inserted in the neck 12 of the vial. The flange 21 is compressed by the crimp so that a system for long time storage of pharmaceutical compositions at low temperature is formed.

Figure 2:
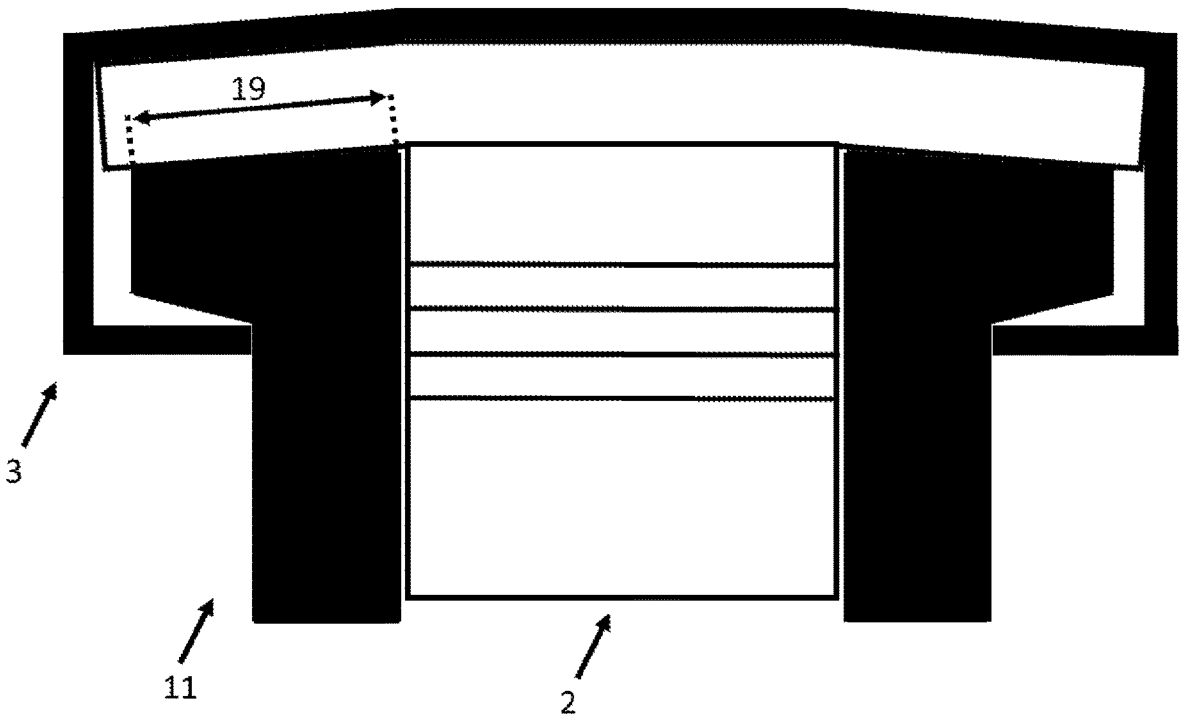
FIG. 2 illustrates a cross-section of an exemplary embodiment of an upper part of the system.

FIG. 2 depicts a cross section of the upper part of the system according to an embodiment. FIG. 2 is a cutout and magnification of the upper part of FIG. 1. The stopper 2 is inserted in the neck 12 of the vial. The crimp exerts a force on the crown 13 and the flange 21 to form a horizontal contact area 19 between the upper crown surface 131 and the lower flange surface 211. The horizontal contact area 19 exhibits a right circular conical frustum shape.

FIG. 3 shows a cross section of the upper part of the container according to an embodiment. The crown exhibits an inner crown diameter 141 of 6.87 mm and an outer crown diameter 142 of 13.04 mm. In FIG. 3, the inner diameter of the neck is equal to the inner crown diameter 141. The crown 1 has a height 143 of 3.51 mm. The distance 144 between the upper inner crown edge 151 and the lower inner crown edge 152 is 4.04 mm. The angle 41 between a line, defined by the upper crown surface 131, and a line, defined by the center axis 4 of the container, is 87.97°. The angle 42 between a line, defined by the upper inner crown edge 151 and the lower inner crown edge 152, and a line, defined by the center axis 4 of the container, is 34°. The angle 43 between a line, defined by the lower crown surface 132, and a line, defined by the center axis 4 of the container, is 11.81°.

FIG. 4 depicts a cross section of an exemplary embodiment of a stopper provided according to the invention. The stopper comprises a flange 21 and a plug 22, the flange 21 comprising a lower flange surface 211 and a flange height 212 of 3.33 mm.

Figure 5:
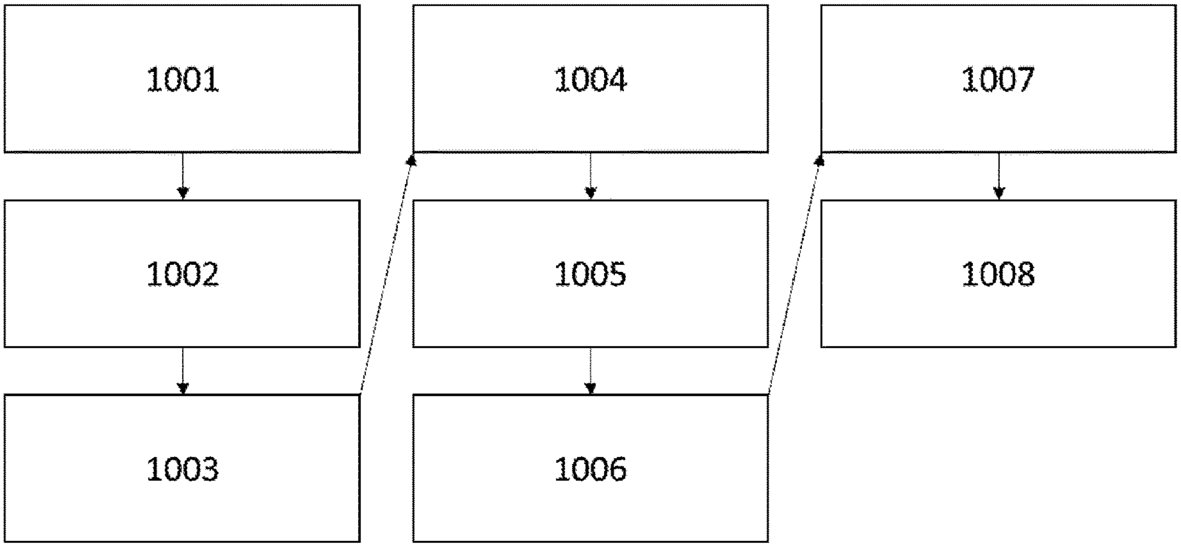
FIG. 5 is a block diagram illustrating an exemplary embodiment of a method provided according to the invention.

FIG. 5 shows a block diagram of an exemplary embodiment of a method provided according to the invention. A step 1001 is providing a container 1 comprising a neck 11 and a crown 13, the crown 13 comprising an upper crown surface 131. In a step 1002, the container is filled with a pharmaceutical composition. A step 1003 is positioning a stopper 2 comprising a flange 21 and a plug 22, the flange 21 comprising a lower flange surface 211 and a flange height 212 such that the plug 22 is positioned in the neck 11 and the upper crown surface 131 is in contact with the lower flange surface 211. A step 1004 is exerting a force on the crown 13 and the flange 21 to form a horizontal contact area 19 between the upper crown surface 131 and the lower flange surface 211 by a holding element 3 such that the following conditions are fulfilled: i) the horizontal contact area 19 has a size of 30 $mm^2$ to 300 $mm^2$; and ii) the flange height 212 is compressed at least partially in the horizontal contact area 19, for example in the entire horizontal contact area 19, by 10% to 40%. After that, in a step 1005, the system is cooled to a low temperature. Afterwards, in a step 1006, the system is stored for 1 day to 1000 days, for example 7 day to 350 days or 30 days to 150 days at the low temperature. Thereafter, in a step 1007, the system is heated, for example to room temperature. A step 1008 is discharging at least a part of the pharmaceutical composition out of the system within 1 month, for example 1 week or 1 day.

Items

Exemplary items are the following. The combination of 2 or 3 or 4 or more items is also contemplated. The following items 1-43 describe exemplary embodiments provided according to the invention and should not be construed as claims.

1. Use of a system for long time storage of pharmaceutical compositions at low temperature, the system comprising: a container 1 comprising a neck 11 and a crown 13, wherein the crown 13 comprises an upper crown surface 131; a stopper 2 comprising a flange 21 and a plug 22, wherein the flange 21 comprises a lower flange surface 211 and a flange height 212; a holding element 3, wherein the holding element 3 is configured to exert a force on the crown 13 and the flange 21 to form a horizontal contact area 19 between the upper crown surface 131 and the lower flange surface 211.

2. System for long time storage of pharmaceutical compositions at low temperature, the system comprising: a container 1 comprising a neck 11 and a crown 13, wherein the crown 13 comprises an upper crown surface 131; a stopper 2 comprising a flange 21 and a plug 22, wherein the flange 21 comprises a lower flange surface 211 and a flange height 212; a holding element 3, wherein the holding element 3 is configured to exert a force on the crown 13 and the flange 21 to form a horizontal contact area 19 between the upper crown surface 131 and the lower flange surface 211.

3. Use or System according to item 1 or 2, wherein the horizontal contact area 19 has a size of 30 $mm^2$ to 300 $mm^2$.

4. Use or System according to any one of the preceding items, wherein the flange height 212 is compressed at least partially in the horizontal contact area 19 by 10% to 40%.

5. Method for closing a container 1 for long time storage of pharmaceutical compositions at low temperature, which may be according to any one of the preceding items, comprising the following steps: providing a container 1 comprising a neck 11 and a crown 13, wherein the crown 13 comprises an upper crown surface 131; positioning a stopper 2 comprising a flange 21 and a plug 22, wherein the flange 21 comprises a lower flange surface 211 and a flange height 212 such that the plug 22 is positioned in the neck 11 and the upper crown surface 131 is in contact with the lower flange surface 211; exerting a force on the crown 13 and the flange 21 to form a horizontal contact area 19 between the upper crown surface 131 and the lower flange surface 211 by a holding element 3 such that the following conditions are fulfilled: i) the horizontal contact area 19 has a size of 30 $mm^2$ to 300 $mm^2$; and ii) the flange height 212 is compressed at least partially in the horizontal contact area 19 by 10% to 40%.

6. A bundle comprising 5 or more, for example 5 to 10000, 20 to 500, or 50 to 200, systems according to any one of the preceding items.

7. A kit for long time storage of pharmaceutical compositions at low temperature, the kit comprising: a container 1 comprising a neck 11 and a crown 13, wherein the crown 13 comprises an upper crown surface 131; a stopper 2 comprising a flange 21 and a plug 22, wherein the flange 21 comprises a lower flange surface 211 and a flange height 212; wherein, when the stopper is inserted in the container a horizontal contact area 19 is formed and a force is exerted on the crown 13 and the flange 21 so that the flange height 212 is compressed at least partially in the horizontal contact area 19 by 10% to 40%, the horizontal contact area 19 has a size of 30 $mm^2$ to 300 $mm^2$.

8. Use, system, method, bundle, and/or kit; according to any one of the preceding items, wherein the container is a vial and/or a cartridge.

9. Use, system, method, bundle, and/or kit; according to any one of the preceding items, wherein the container comprises, for example is made of, glass, for example borosilicate glass or alumosilicate glass; or polymer, for example cyclic olefin polymer (COP) or cyclic olefin copolymer (COC).

10. Use, system, method, bundle, and/or kit; according to any one of the preceding items, wherein the inner crown diameter 141 is 3 mm to 25 mm, for example 4 mm to 20 mm, 5 mm to 15 mm, 6.5 mm to 10 mm, 6.9 mm to 7.1 mm, or 6.95 mm to 7.05 mm; and/or wherein the outer crown diameter 142 is 4 mm to 33 mm, for example 5 mm to 30 mm, 8 mm to 20 mm, 12.8 mm to 13.1 mm, or 12.95 mm to 13.05 mm; and/or wherein the crown height 143 is 2 mm to 5 mm, for example 3 mm to 4 mm, 3.4 mm to 3.8 mm, 3.5 mm to 3.7 mm, or 3.55 mm to 3.65 mm.

11. Use, system, method, bundle, and/or kit; according to any one of the preceding items, wherein the distance 144 between the upper inner crown edge 151 and the lower inner crown edge 152 is 3 mm to 5 mm, for example 3.8 mm to 4.6 mm, 3.9 mm to 4.2 mm, or 4.0 mm to 4.1 mm.

12. Use, system, method, bundle, and/or kit; according to any one of the preceding items, wherein the angle 41 between a line, defined by the upper crown surface 131, and a line, defined by the center axis 4 of the container, is 75° to 89.99°, for example 80° to 89.5°, 85° to 89°, 85.5° to 88.5°, or 86.5° to 87.5°.

13. Use, system, method, bundle, and/or kit; according to any one of the preceding items, wherein the angle 43 between a line, defined by the lower crown surface 132, and a line, defined by the center axis 4 of the container, is 65° to 87°, for example 70° to 86° or 75° to 85°.

14. Use, system, method, bundle, and/or kit; according to any one of the preceding items, wherein the ratio [°/°] of the minimal value of the angle 41 between a line, defined by the upper crown surface 131, and a line, defined by the center axis 4 of the container, and the maximal value of the angle 41 between a line, defined by the upper crown surface 131, and a line, defined by the center axis of the neck 4, is 0.8 or more, for example 0.9 or more, 0.95 or more, or 0.97 or more; and/or 0.99 or less.

15. Use, system, method, bundle, and/or kit; according to any one of the preceding items, wherein the angle 42 between a line, defined by the upper inner crown edge 151 and the lower inner crown edge 152, and a line, defined by the center axis 4 of the container, is 10° to 50°, for example 12° to 42°, 15° to 37°, or 20° to 33°.

16. Use, system, method, bundle, and/or kit; according to any one of the preceding items, wherein the ratio [mm/mm] of the values of the minimal and maximal inner crown diameter 141 is 0.95 to 1.00, for example 0.96 to 0.99 or 0.97 to 0.98.

17. Use, system, method, bundle, and/or kit; according to any one of the preceding items, wherein the upper crown surface 131 has an average surface roughness Ra of 2 nm to 200 nm, for example 5 nm to 100 nm, 10 nm to 75 nm, or 25 nm to 50 nm.

18. Use, system, method, bundle, and/or kit; according to any one of the preceding items, wherein the inner and/or outer surface of the container is coated, for example coated by a coating comprising silicone or a coating obtained by CVD method, PICVD or PECVD method.

19. Use, system, method, bundle, and/or kit; according to any one of the preceding items, wherein the upper crown surface is uncoated.

20. Use, system, method, bundle, and/or kit; according to any one of the preceding items, wherein the flange height 212 is 0.1 mm to 6 mm, for example 1 to 5 mm, 2 mm to 4 mm, or 2.5 mm to 3.9 mm.

21. Use, system, method, bundle, and/or kit; according to any one of the preceding items, wherein the stopper 2 comprises, for example is made of, a thermoplastic elastomer, for example a thermoplastic elastomer comprising butyl groups and halogen, such as F, Cl and/or Br.

22. Use, system, method, bundle, and/or kit; according to any one of the preceding items, wherein the E Module of the stopper 2 is 1 $N/mm^2$ to 10 $N/mm^2$, for example 2 $N/mm^2$ to 8 $N/mm^2$, 2.4 $N/mm^2$ to 7.3 $N/mm^2$, or 4.4 $N/mm^2$ to 6.6 $N/mm^2$.

23. Use, system, method, bundle, and/or kit; according to any one of the preceding items, wherein the shore hardness A of the stopper 2 is 40 to 80, for example 42 to 60, 45 to 55, or 47 to 52.

24. Use, system, method, bundle, and/or kit; according to any one of the preceding items, wherein the lower flange surface 211 has an average surface roughness Ra of 1 nm to 1000 nm, for example 3 nm to 200 nm, 5 nm to 100 nm, 10 nm to 75 nm, or 25 nm to 50 nm.

25. Use, system, method, bundle, and/or kit; according to any one of the preceding items, wherein the holding element 3 is a crimp or a cap, for example a press fit cap, an aluminum hole cap, a pull off cap, a finger design cap, a scoreline design cap, a bridge design cap, a scoreline tear off cap, a center tear off cap, a double tear off cap, an universal tear off cap and/or an flip tear off cap.

26. Use, system, method, bundle, and/or kit; according to any one of the preceding items, wherein low temperature is −200° C. or more and less than 0° C., for example −196° C. or more and −10° C. or less, −100° C. or more and −15° C. or less, or −90° C. or more and −50° C. or less.

27. Use, system, method, bundle, and/or kit; according to any one of the preceding items, wherein the pressure inside the container 1 is less than ambient pressure, for example 0.1 to 0.9 bar, 0.2 to 0.8 bar, or 0.3 bar to 0.7 bar.

28. Use, system, method, bundle, and/or kit; according to any one of the preceding items, wherein long time storage is 1 day or more and 5 years or less, for example 7 days or more and 4 years or less, 1 month or more and 3 years or less, or 6 months or more and 18 months or less.

29. Use, system, method, bundle, and/or kit; according to any one of the preceding items, wherein the system, for example the container 1, comprises a pharmaceutical composition comprising water, for example 10 wt-% to 100 wt-% water or 50 wt-% to 99 wt-%.

30. Use, system, method, bundle, and/or kit; according to any one of the preceding items, wherein the system, for example the container 1, comprises a pharmaceutical composition comprising RNA, for example mRNA, vectors and/or cells.

31. Use, system, method, bundle, and/or kit; according to any one of the preceding items, wherein the horizontal contact area 19 has a size of 50 $mm^2$ to 250 $mm^2$, for example 80 $mm^2$ to 220 $mm^2$, 100 $mm^2$ to 180 $mm^2$, or 120 $mm^2$ to 150 $mm^2$.

32. Use, system, method, bundle, and/or kit; according to any one of the preceding items, wherein the horizontal contact area 19 has a width of 0.1 mm to 5 mm, for example 0.2 mm to 4 mm, 0.3 mm to 3 mm, or 0.4 mm to 2.5 mm.

33. Use, system, method, bundle, and/or kit; according to any one of the preceding items, wherein the flange height 212 is compressed by 15 to 30%, for example 20 to 25%.

34. Use, system, method, bundle, and/or kit; according to any one of the preceding items, wherein the horizontal contact area 19 comprises the upper inner crown edge 151, and wherein the flange height 212 is compressed at the upper inner crown edge 151 by 10% to 40%, for example 20 to 35% or 25 to 30%.

35. Use, system, method, bundle, and/or kit; according to any one of the preceding items, wherein the flange height 212 is compressed in the entire horizontal contact area 19, by 10% to 40%, for example 20 to 35% or 25 to 30%.

36. Use, system, method, bundle, and/or kit; according to any one of the preceding items, wherein the ratio [nm/nm] of the average surface roughness Ra of the upper crown surface 131 to the average surface roughness Ra of the lower flange surface 211 is 1 or less, for example 0.8 or less, 0.5 or less, 0.1 or less, 0.01 or less, or $1*10^{-3}$ or less.

37. Use, system, method, bundle, and/or kit; according to any one of the preceding items, wherein the system, for example all systems in the bundle, pass(es) the container closure integrity test according to DIN EN ISO 8871-5: 2016; chapter 4.4 in combination with Annex D.

38. Use, system, method, bundle, and/or kit; according to any one of the preceding items, wherein the system, for example all systems in the bundle, pass(es) a modified container closure integrity test, wherein the modified container closure integrity test is a test according to DIN EN ISO 8871-5:2016; chapter 4.4 in combination with Annex D, wherein the pressure in part D.4.2 in Annex D is increased to 2 bar instead of decreased to 27 kPa.

39. Use, system, method, bundle, and/or kit; according to any one of the preceding items, wherein the system exhibits a low temperature.

40. Use, system, method, bundle, and/or kit; according to any one of the preceding items, wherein the pressure inside the system is 1.0 bar measured at 20° C.

41. Method according to any one of the preceding items, further comprising the step: cooling the system to a low temperature.

42. Method according to any one of the preceding items, comprising the steps, which may be in this order: providing a container 1 comprising a neck 11 and a crown 13, wherein the crown 13 comprises an upper crown surface 131; filling the container with a pharmaceutical composition; positioning a stopper 2 comprising a flange 21 and a plug 22, wherein the flange 21 comprises a lower flange surface 211 and a flange height 212 such that the plug 22 is positioned in the neck 11 and the upper crown surface 131 is in contact with the lower flange surface 211; exerting a force on the crown 13 and the flange 21 to form a horizontal contact area 19 between the upper crown surface 131 and the lower flange surface 211 by a holding element 3 such that the following conditions are fulfilled: i) the horizontal contact area 19 has a size of 30 $mm^2$ to 300 $mm^2$; and ii) the flange height 212 is compressed at least partially in the horizontal contact area 19, for example in the entire horizontal contact area 19, by 10% to 40%; cooling the system to a low temperature; storing the system for 1 day to 1000 days, for example 7 day to 350 days, or 30 days to 150 days at the low temperature; heating the system, for example to room temperature; and discharging at least a part of the pharmaceutical composition out of the system within 1 month, for example 1 week or 1 day.

43. Kit according to any one of the preceding items, the kit further comprising: a holding element 3, wherein the holding element 3 is configured to exert the force on the crown 13 and the flange 21.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

1 container
12 neck
13 crown
131 upper crown surface
132 lower crown surface
141 inner crown diameter
142 outer crown diameter
151 upper inner crown edge
152 lower inner crown edge
19 horizontal contact area
2 stopper
21 flange

211 lower flange surface
212 flange height
22 plug
3 holding element
4 center axis of the neck
41 angle between a line, defined by the upper crown surface, and a line, defined by the center axis of the neck
42 angle between a line, defined by the upper inner crown edge and the lower inner crown edge, and a line, defined by the center axis of the neck
43 angle between a line, defined by the lower crown surface, and a line, defined by the center axis of the neck

What is claimed is:

1. At least one system for storage of pharmaceutical compositions, the at least one system comprising:
a container comprising a neck and a crown, the crown comprising an upper crown surface;
a stopper comprising a flange and a plug, the flange comprising a lower flange surface and a flange height; and
a holding element configured to exert a force on the crown and the flange to form a horizontal contact area between the upper crown surface and the lower flange surface, the horizontal contact area having a size of 30 $mm^2$ to 300 $mm^2$ and the flange height being compressed at least partially in the horizontal contact area by 10% to 40%, wherein the horizontal contact area and the flange height are configured to maintain tightness at low temperatures, and wherein the container comprises an opening and the flange extends radially away from the opening past the upper crown surface.

2. The at least one system of claim 1, wherein an angle between a line defined by the upper crown surface and a line defined by a center axis of the container is 75° to 89.99°.

3. The at least one system of claim 2, wherein the angle is 85.5° to 88.5°.

4. The at least one system of claim 1, wherein at least one of the following is satisfied:
a ratio [mm/mm] of values of a minimal inner crown diameter and a maximal inner crown diameter is 0.95 to 1.00; or
the upper crown surface has an average surface roughness Ra of 2 nm to 200 nm.

5. The at least one system of claim 1, wherein at least one of the following is satisfied:
at least one of an inner surface or an outer surface of the container is coated; or
the upper crown surface is uncoated.

6. The at least one system of claim 5, wherein the container is coated by a coating comprising silicone or a coating obtained by a chemical vapor deposition method.

7. The at least one system of claim 1, wherein at least one of the following is satisfied:
the stopper comprises a thermoplastic elastomer;
an E Module of the stopper is 1 $N/mm^2$ to 10 $N/mm^2$; or
a shore hardness A of the stopper is 40 to 80.

8. The at least one system of claim 7, wherein the thermoplastic elastomer comprises butyl groups and halogen.

9. The at least one system of claim 1, wherein the horizontal contact area has a size of 50 $mm^2$ to 250 $mm^2$.

10. The at least one system of claim 1, wherein the horizontal contact area has a width of 0.1 mm to 5 mm.

11. The at least one system of claim 1, wherein the flange height is compressed by 15% to 30%.

12. The at least one system of claim 1, wherein the horizontal contact area comprises an upper inner crown edge and the flange height is compressed at the upper inner crown edge by 10% to 40%.

13. The at least one system of claim 12, wherein a distance between the upper inner crown edge and a lower inner crown edge is 3 mm to 5 mm.

14. The at least one system of claim 1, wherein the at least one system passes a container closure integrity test according to DIN EN ISO 8871-5:2016; chapter 4.4 in combination with Annex D.

15. The at least one system of claim 1, wherein the container comprises a pharmaceutical composition at a temperature that is −200° C. or more and less than 0° C.

16. The at least one system of claim 15, wherein the pharmaceutical composition comprises 50 wt-% to 99 wt-% water.

17. The at least one system of claim 15, wherein the pharmaceutical composition is at a temperature that is −80° C. or more and −20° C. or less.

18. The at least one system of claim 1, wherein the at least one system comprises 5 or more systems forming a bundle.

19. At least one system for storage of pharmaceutical compositions, the at least one system comprising:
a container comprising a neck and a crown, the crown comprising an upper crown surface;
a stopper comprising a flange and a plug, the flange comprising a lower flange surface and a flange height; and
a holding element configured to exert a force on the crown and the flange to form a horizontal contact area between the upper crown surface and the lower flange surface, the horizontal contact area having a size of 30 $mm^2$ to 300 $mm^2$ and the flange height being compressed at least partially in the horizontal contact area by 10% to 40%, wherein the horizontal contact area and the flange height are configured to maintain tightness at low temperatures, wherein the at least one system passes a modified container closure integrity test, wherein the modified container closure integrity test is a test according to DIN EN ISO 8871-5:2016; chapter 4.4 in combination with Annex D, wherein a pressure in part D.4.2 in Annex D is increased to 2 bar instead of decreased to 27 kPa, and wherein the container comprises an opening and the flange extends radially away from the opening past the upper crown surface.

* * * * *